(12) United States Patent
Cheok et al.

(10) Patent No.: US 7,908,041 B2
(45) Date of Patent: Mar. 15, 2011

(54) SELF-LEVELING LASER HORIZON FOR NAVIGATION GUIDANCE

(75) Inventors: Ka C. Cheok, Troy, MI (US); G. Edzko Smid, Rochester Hills, MI (US)

(73) Assignee: Munro & Associates, Inc., Troy, MI (US)

( * ) Notice: Subject to any disclaimer, the term of this patent is extended or adjusted under 35 U.S.C. 154(b) by 1297 days.

(21) Appl. No.: 11/118,636

(22) Filed: Apr. 29, 2005

(65) Prior Publication Data

US 2006/0080004 A1 Apr. 13, 2006

Related U.S. Application Data

(60) Provisional application No. 60/566,261, filed on Apr. 29, 2004, provisional application No. 60/606,803, filed on Sep. 2, 2004.

(51) Int. Cl.
*G01C 23/00* (2006.01)
(52) U.S. Cl. ............ 701/3; 701/4; 701/10; 356/140; 356/141.1; 356/141.2; 244/1 R
(58) Field of Classification Search ............ 701/1, 220, 701/3–4, 10; 455/456.5; 340/973, 975, 945, 340/950, 980, 974; 33/286, 290, 291; 74/534; 359/843; 356/141.2, 140, 141.1
See application file for complete search history.

(56) References Cited

U.S. PATENT DOCUMENTS

| | | | |
|---|---|---|---|
| 3,530,470 A | | 9/1970 | Sheftelman et al. |
| 3,599,495 A | * | 8/1971 | Brown et al. .......... 74/534 |
| 3,784,968 A | * | 1/1974 | Brosow .......... 340/955 |
| 3,790,766 A | * | 2/1974 | Brown .......... 701/220 |
| 3,807,849 A | * | 4/1974 | Lobb .......... 353/98 |
| 3,817,624 A | * | 6/1974 | Martin .......... 356/138 |
| 4,033,045 A | | 7/1977 | Wing |
| 4,035,805 A | * | 7/1977 | Mobley .......... 342/426 |
| 4,094,200 A | | 6/1978 | Chombard |

(Continued)

FOREIGN PATENT DOCUMENTS

EP 0341812 11/1989

(Continued)

OTHER PUBLICATIONS

Planning a Large-Scale Progression of R&D—a Pilot Study in the Aerospace Domain; Shapiro, A.A.; Price, G.; Cornford, S.L.; Gawdiak, Y.O.; Feather, M.S.; Ricks, W.R.; Aerospace Conference, 2006 IEEE; Mar. 4-11, 2006 pp. 1-14; Digital Object Identifier 10.1109/AER0.2006.1656015.*

(Continued)

*Primary Examiner* — Cuong H Nguyen
(74) *Attorney, Agent, or Firm* — Oakland Law Group, PLLC

(57) ABSTRACT

The present invention includes an artificial horizon device including a sensor unit with a movable platform, at least one actuator linked to the platform, and one or more sensors located on the platform for sensing the position orientation of the platform relative to an external mass or the motion of the platform. The horizon device also includes a processing unit signally connected to the sensors and the at least one actuator. The processing unit is adapted to receive signals from the sensors and send signals to the actuators to move the platform to a horizontal orientation. The horizon device also includes either a display unit comprising an indicator of a horizon line which substantially corresponds to the horizontal orientation of the platform or a secondary device.

20 Claims, 4 Drawing Sheets

U.S. PATENT DOCUMENTS

| | | | |
|---|---|---|---|
| 4,136,394 A | 1/1979 | Jones et al. | |
| 4,185,394 A | 1/1980 | Younkin | |
| 4,229,737 A | 10/1980 | Heldwein et al. | |
| 4,273,225 A | 6/1981 | Swanson | |
| 4,397,555 A | 8/1983 | Malcolm et al. | |
| 4,488,249 A * | 12/1984 | Baker | 702/92 |
| 4,616,226 A | 10/1986 | Morley | |
| 4,667,196 A * | 5/1987 | Kaul | 340/954 |
| 4,738,531 A * | 4/1988 | Lloyd et al. | 356/152.2 |
| 4,743,903 A | 5/1988 | Morley | |
| 4,799,062 A | 1/1989 | Sanderford, Jr. et al. | |
| 4,800,501 A * | 1/1989 | Kinsky | 701/220 |
| 4,868,720 A | 9/1989 | Miyauchi et al. | |
| 4,882,845 A | 11/1989 | Boyer | |
| 4,882,854 A * | 11/1989 | Wedel et al. | 34/115 |
| 4,943,158 A | 7/1990 | Pertl et al. | |
| 4,964,723 A * | 10/1990 | Murgue et al. | 356/139.04 |
| 4,988,192 A | 1/1991 | Knittel | |
| 5,000,398 A * | 3/1991 | Rashev | 244/2 |
| 5,037,166 A | 8/1991 | Malcolm et al. | |
| 5,148,018 A | 9/1992 | Ammann | |
| 5,198,812 A * | 3/1993 | Probert | 340/975 |
| 5,218,355 A * | 6/1993 | Burkhardt | 340/974 |
| 5,343,313 A | 8/1994 | Fergason | |
| 5,347,286 A * | 9/1994 | Babitch | 342/359 |
| 5,400,244 A | 3/1995 | Watanabe et al. | |
| 5,486,821 A * | 1/1996 | Stevens et al. | 340/970 |
| 5,582,518 A * | 12/1996 | Henique et al. | 434/44 |
| 5,734,421 A * | 3/1998 | Maguire, Jr. | 348/121 |
| 5,883,598 A | 3/1999 | Parl et al. | |
| 5,889,479 A * | 3/1999 | Tabel | 340/958 |
| 5,901,172 A | 5/1999 | Fontana | |
| 5,901,358 A | 5/1999 | Petty et al. | |
| 5,922,039 A * | 7/1999 | Welch et al. | 701/116 |
| 5,966,680 A | 10/1999 | Butnaru | |
| 6,021,330 A | 2/2000 | Vannucci | |
| 6,042,533 A | 3/2000 | Kania | |
| 6,054,950 A | 4/2000 | Fontana | |
| 6,091,362 A | 7/2000 | Stilp et al. | |
| 6,101,391 A | 8/2000 | Ishizuka et al. | |
| 6,108,558 A | 8/2000 | Vanderspool, II | |
| 6,160,616 A | 12/2000 | Ohtomo et al. | |
| 6,167,275 A | 12/2000 | Oros et al. | |
| 6,175,440 B1 * | 1/2001 | Conemac | 359/204.1 |
| 6,181,371 B1 * | 1/2001 | Maguire, Jr. | 348/121 |
| 6,196,514 B1 * | 3/2001 | Kienholz | 248/550 |
| 6,201,973 B1 | 3/2001 | Kowaguchi | |
| 6,239,725 B1 * | 5/2001 | Bray | 340/953 |
| 6,239,741 B1 | 5/2001 | Fontana et al. | |
| 6,249,252 B1 | 6/2001 | Dupray | |
| 6,381,464 B1 | 4/2002 | Vannucci | |
| 6,405,047 B1 | 6/2002 | Moon | |
| 6,430,521 B1 | 8/2002 | Toda | |
| 6,459,903 B1 | 10/2002 | Lee | |
| 6,473,619 B1 | 10/2002 | Kong et al. | |
| 6,477,379 B2 | 11/2002 | Kingdon | |
| 6,490,456 B1 | 12/2002 | Bogdan et al. | |
| 6,505,085 B1 * | 1/2003 | Tuttle et al. | 700/28 |
| 6,522,890 B2 | 2/2003 | Drane et al. | |
| 6,539,229 B1 | 3/2003 | Ali | |
| 6,556,832 B1 | 4/2003 | Soliman | |
| 6,604,060 B1 * | 8/2003 | Ryan et al. | 702/186 |
| 6,643,004 B2 | 11/2003 | Detweiler et al. | |
| 6,658,258 B1 | 12/2003 | Chen et al. | |
| 6,675,018 B2 | 1/2004 | Villier et al. | |
| 6,675,800 B2 | 1/2004 | Keller | |
| 6,690,741 B1 | 2/2004 | Larrick, Jr. et al. | |
| 6,692,428 B1 | 2/2004 | Kania | |
| 6,694,142 B1 | 2/2004 | Kuwahara et al. | |
| 6,694,196 B2 * | 2/2004 | Tuttle et al. | 700/28 |
| 6,700,533 B1 | 3/2004 | Werb et al. | |
| 6,702,229 B2 * | 3/2004 | Anderson et al. | 244/1 R |
| 6,754,584 B2 * | 6/2004 | Pinto et al. | 701/215 |
| 6,798,443 B1 * | 9/2004 | Maguire, Jr. | 348/121 |
| 6,810,140 B2 * | 10/2004 | Yang et al. | 382/154 |
| 6,812,884 B2 | 11/2004 | Richley et al. | |
| 6,882,315 B2 | 4/2005 | Richley et al. | |
| 6,908,626 B2 * | 6/2005 | Cooper et al. | 424/489 |
| 6,941,144 B2 | 9/2005 | Stein | |
| 7,110,881 B2 | 9/2006 | Gray et al. | |
| 7,132,982 B2 | 11/2006 | Smith et al. | |
| 7,215,698 B2 | 5/2007 | Darby et al. | |
| 7,280,896 B2 * | 10/2007 | Morizet et al. | 701/3 |
| 7,286,624 B2 | 10/2007 | Woo et al. | |
| 7,403,783 B2 | 7/2008 | Cheok et al. | |
| 7,490,572 B2 * | 2/2009 | Grober | 114/191 |
| 2001/0034223 A1 | 10/2001 | Rieser et al. | |
| 2001/0046869 A1 | 11/2001 | Cedervall et al. | |
| 2002/0034161 A1 | 3/2002 | Deneire et al. | |
| 2002/0122003 A1 * | 9/2002 | Patwari et al. | 342/450 |
| 2002/0132623 A1 | 9/2002 | Kingdon | |
| 2002/0160787 A1 | 10/2002 | Chen et al. | |
| 2002/0165669 A1 * | 11/2002 | Pinto et al. | 701/213 |
| 2002/0183071 A1 | 12/2002 | Shioda et al. | |
| 2003/0008622 A1 | 1/2003 | Fernandez-Corbaton et al. | |
| 2003/0018400 A1 * | 1/2003 | Tuttle et al. | 700/29 |
| 2003/0058136 A1 * | 3/2003 | Hedrick | 340/973 |
| 2003/0069026 A1 | 4/2003 | Hoctor et al. | |
| 2003/0090652 A1 | 5/2003 | Detwiler et al. | |
| 2003/0096624 A1 | 5/2003 | Ormson | |
| 2003/0132860 A1 * | 7/2003 | Feyereisen et al. | 340/973 |
| 2003/0144006 A1 | 7/2003 | Johansson et al. | |
| 2003/0190920 A1 | 10/2003 | An | |
| 2004/0035347 A1 * | 2/2004 | Grober | 114/191 |
| 2004/0158355 A1 | 8/2004 | Holmqvisst | |
| 2004/0183673 A1 | 9/2004 | Nageli | |
| 2005/0012642 A1 * | 1/2005 | Sacle | 340/973 |
| 2005/0192024 A1 | 9/2005 | Sheynblat | |
| 2005/0215269 A1 | 9/2005 | Cheok | |
| 2005/0228613 A1 | 10/2005 | Fullerton et al. | |
| 2008/0103696 A1 | 5/2008 | Cheok et al. | |
| 2008/0167051 A1 | 7/2008 | Cheok et al. | |

FOREIGN PATENT DOCUMENTS

| | | |
|---|---|---|
| EP | 0269026 | 6/1993 |
| EP | 0729053 | 8/1996 |
| EP | 0 936 829 A2 | 8/1999 |
| EP | 0 936 829 A3 | 5/2000 |
| EP | 1026476 | 8/2000 |
| EP | 0787972 | 10/2003 |
| EP | 0829702 | 11/2003 |
| EP | 1292043 A1 | 12/2003 |
| GB | 1206849 | 8/1968 |
| GB | 2383216 A | 6/2003 |
| JP | 10226392 A * | 8/1998 |
| RU | 790477 A1 * | 6/1995 |
| RU | 2062987 | 6/1996 |
| WO | WO 92/08107 | 5/1992 |
| WO | WO92/19935 | 11/1992 |
| WO | WO92/20998 | 11/1992 |
| WO | WO96/01978 | 1/1996 |
| WO | WO 00/14480 | 3/2000 |
| WO | 00/68907 A | 11/2000 |
| WO | WO03/034168 | 4/2003 |
| WO | WO03074970 | 9/2003 |
| WO | 2005/081012 A1 | 9/2005 |
| WO | 2005/108924 A1 | 11/2005 |

OTHER PUBLICATIONS

FUMS™ Fusion and Decision Support for Intelligent Management of Aircraft Data; Azzam, H.; Knight, P.; Cook, J.; Moses, E.; Aerospace Conference, 2006 IEEE; Mar. 4-11, 2006 pp. 1-16; Digital Object Identifier 10.1109/AERO.2006.1656115.*

Stray Voltage and Equipotential Planes Revisited Rebuttal of Equipotential Planes a Figment of the Imagination; Parker, D.M.; Industrial and Commercial Power Systems Technical Conference, 2006 IEEE; 30-05 Apr. 2006 pp. 1-31.*

Complexity analysis in the next generation of air traffic management system; Cano, M.; Sanchez-Escalonilla, P.; Dorado, M.M.; Digital Avionics Systems Conference, 2007. DASC '07. IEEE/AIAA 26th; Oct. 21-25, 2007 pp. 3.D.4-1-3.D.4-9; Digital Object Identifier 10.1109/DASC.2007.4391890.*

Improving air navigation service for general aviation by using datalink; Erzell, A.; Li, R.; Digital Avionics Systems Conference, 2007.

DASC '07. IEEE/AIAA 26th; Digital Object Identifier: 10.1109/DASC.2007.4391912; Publication Year: 2007, pp. 4.C.6-1-4.C.6-11.*

A vision system for intelligent mission profiles of micro air vehicles; Todorovic, S.; Nechyba, M.C.; Vehicular Technology, IEEE Transactions on; vol. 53, Issue: 6; Digital Object Identifier: 10.1109/TVT.2004.834880 Publication Year: 2004, pp. 1713-1725.*

A Low-Power Visual-Horizon Estimation Chip; Horiuchi, T.K.; Circuits and Systems I: Regular Papers, IEEE Transactions on vol. 56, Issue: 8; Digital Object Identifier: 10.1109/TCSI.2008.2010097; Publication Year: 2009, pp. 1566-1575.*

Application Programming Interface for Real-Time Receding Horizon Control; Keviczky, T. et al.; Decision and Control, 2005 and 2005 European Control Conference. CDC-ECC '05. 44th IEEE Conference on; Digital Object Identifier: 10.1109/CDC.2005.1582343; Publication Year: 2005, pp. 1331-1336.*

Smart view for a smart grid—Unmanned Aerial Vehicles for transmission lines; Toth, Janos; Gilpin-Jackson, Adelana; Applied Robotics for the Power Industry (CARPI), 2010 1st International Conference on; Digital Object Identifier: 10.1109/CARPI.2010.5624465; Publication Year: 2010, pp. 1-6.*

EMI problems & its countermeasures during the testing of Head-Up-Display for trainer aircraft; Angra, P. et al.; Electromagnetic Interference & Compatibility, 2008. INCEMIC 2008. 10th International Conference on; Publication Year: 2008, pp. 141-144.*

Simulation Development of Aircraft Cockpit Instruments Based on GL Studio; Wang Li-jing et al.; Information Engineering and Computer Science, 2009. ICIECS 2009. International Conference on; Digital Object Identifier: 10.1109/ICIECS.2009.5364901 Publication Year: 2009, pp. 1-4.*

Improving air navigation service for general aviation by using datalink; Erzell, A. et al.; Digital Avionics Systems Conference, 2007. DASC '07. IEEE/AIAA 26th; Digital Object Identifier: 10.1109/DASC.2007.4391912; Publication Year: 2007, pp. 4.C.6-1-4.C.6-11.*

Development of a System Integration Laboratory for aircraft avionics systems; Myung Chin Kim et al.; Digital Avionics Systems Conference, 2008. DASC 2008. IEEE/AIAA 27th; Digital Object Identifier: 10.1109/DASC.2008.4702841; Publication Year: 2008, pp. 5.A.1-1-5.A.1-11.*

"Spatial Disorientation—A Perspective", Alan J. Benson, published in RTO-MP-086.

"The Effectiveness of Various Attitude Indicator Display Sizes and Extended Horizon Lines on Attitude Maintenance in a Part-Task Simulation", J. Raymond Comstock, Jr., Leslie C. Jones, and Alan T. Pope, NASA Langley Research Center, Hampton, VA Virginia Tech, Blacksburg, VA.

"Digital Kalman Filter Implementation", Dec. 8, 1997.

International Search Report dated Aug. 9, 2005 (PCT/US2005/015014).

International Search Report dated Apr. 25, 2005 for Serial No. PCT/US2005/004936, published as W02005/081012 on Sep. 1, 2005.

Written Opinion of the International Searching Authority dated Apr. 25, 2005 for Serial No, PCT/US2005/004936, published as (W02005/081012A1).

International Preliminary Report on Patentability dated Jan. 1, 2006 for Serial No. PCT/US2005/004936.

European Search Report dated Mar. 8, 2007, Application No. 05713670.7-2220.

Cheok "Intelligent Autonomous Behavior Techniques for Small Unmanned Ground Vehicle Systems", Proceedings of the International Conference on Intelligent Systems 2005, 2005, XP007904008 Kuala Lumpur Dec. 1-3, 2005 pp. 1-7.

International Search Report (PCT/US2007/079008) Sep. 20, 2007.

International search report, PCT/US2008/057857, mailed Jul. 7, 2008.

Cheok et al., "Fuzzy Neighborhood Filters for UWB Range Radios in Multipath Environments," Mar. 16, 2007.

Cheok et al., "Ultra-Wideband Methods for UGV Positioning: Experimental and Simulation Results," Procs of the US Army Science Conference, Orlando, FL., Dec. 2006.

Copending U.S. Appl. No. 11/857,700, filed Aug. 18, 2007.

Copending U.S. Appl. No. 12/053,208, filed Mar. 21, 2008.

* cited by examiner

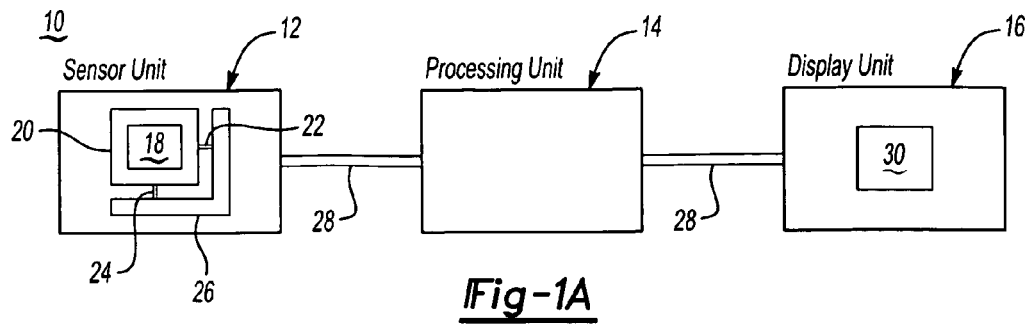
*Fig-1A*
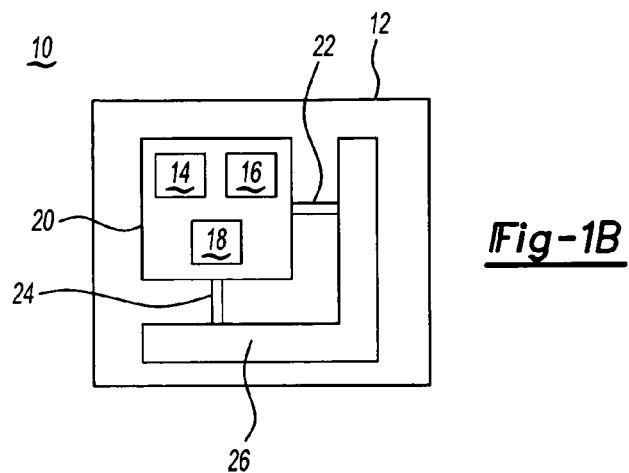
*Fig-1B*
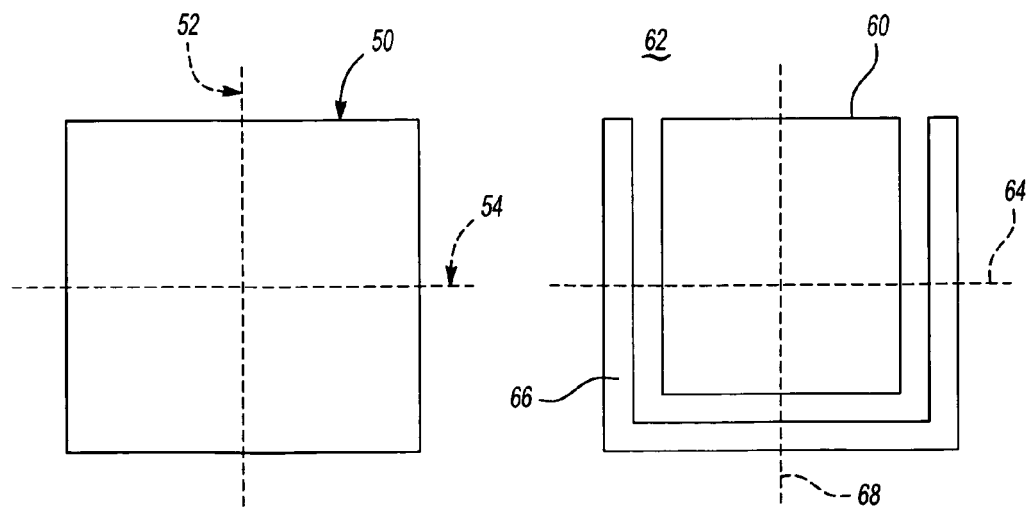
*Fig-2A*  *Fig-2B*

SELF-LEVELING LASER HORIZON FOR NAVIGATION GUIDANCE

CLAIM OF PRIORITY

This application claims the benefit of U.S. Provisional Applications Nos. 60/566,261, filed on Apr. 29, 2004 and 60/606,803, filed on Sep. 2, 2004, both incorporated by reference.

FIELD OF THE INVENTION

The present invention relates to an artificial horizon device and more particularly to an artificial horizon device with improved peripheral visibility.

BACKGROUND OF THE INVENTION

Artificial horizon devices have been used extensively in private, commercial and military applications to assist in the manual navigation of vehicles. However, these devices have drawbacks. Typically, these devices have been placed on the control panel in a discrete location within the central field of vision for the operator. Given the space constraints on the control panel, horizon devices have been limited in size; often no more than a few inches across. The limited size makes them difficult to see and requires that the pilot focus directly on the horizon device to obtain visual information.

Further, known horizon devices have typically been units that float in a liquid such that as the plane shifts, gravity pulls the unit to the horizontal (e.g. a gimbal) or utilized mechanical gyroscopes (e.g. spinning gyroscopes). These types of devices are limited in that they do not provide an output that may be used by secondary devices in the vehicle.

Combination devices strapped down to the vehicle, including accelerometers and gyroscopes, utilize complicated algorithms to de-convolute the cross-correlated sensor signals that result from such a device. Further, these device require the pressure and temperature control of the sensors to provide accurate measurements.

Artificial horizons have also been cost prohibitive for wide adoption.

SUMMARY OF THE INVENTION

The present invention overcomes one or more of these problems.

The present invention includes an artificial horizon device including a sensor unit with a movable platform, at least one actuator linked to the platform, and one or more sensors located on the platform for sensing the position orientation of the platform relative to an external mass or the motion of the platform. The horizon device also includes a processing unit signally connected to the sensors and the at least one actuator. The processing unit is adapted to receive signals from the sensors and send signals to the actuators to move the platform to a horizontal orientation. The horizon device also includes either a display unit comprising an indicator of a horizon line which substantially corresponds to the horizontal orientation of the platform or a secondary device. The invention also includes methods of determining an artificial horizon.

BRIEF DESCRIPTION OF THE DRAWINGS

In the drawings:
FIG. 1A schematically shows one embodiment of a horizon device;
FIG. 1B schematically shows another embodiment of a horizon device;
FIG. 2A shows a unitary platform.
FIG. 2B shows a bifurcated platform.

DETAILED DESCRIPTION

Figure 3:
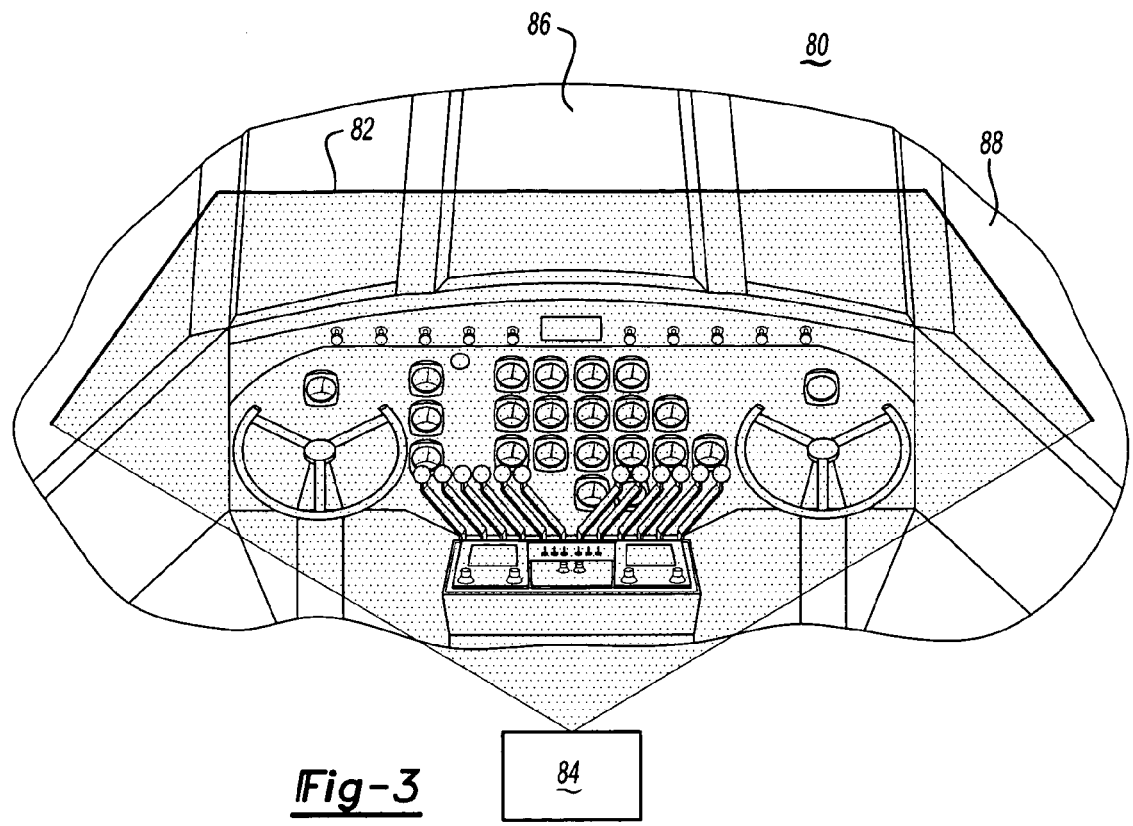
FIG. 3 shows a horizon device with a light line visual indicator.

The present invention includes artificial horizon devices for use in a vehicle, whether it is an operator controlled vehicle or an autonomous vehicle. The devices may be a component of a larger system incorporated into a vehicle or a stand-alone device. The device may be provided as part the original equipment of a vehicle or as an aftermarket, add-on device. The device may be portable, temporarily or permanently installed on the vehicle.

The operation of the horizon device may be manually or automatically controlled. For example, the horizon device may be turned on and calibrated as part of the vehicle start up procedures. Alternately, the horizon device may turn on upon the occurrence of particular visibility conditions (e.g. darkness, fog, or the like), weather conditions (e.g. wind, precipitation, or the like), motion of the vehicle (e.g. particular combinations of pitch, roll, and yaw rates), vehicle position (e.g. latitude, longitude, and altitude), combinations thereof, or the like. For example, upon the occurrence of turbulence in an aircraft, the horizon device may turn on automatically. Alternately, when the vehicle receives data from a weather radio indicating that the vehicle is approaching inclement weather, the horizon device may use that data to turn itself on.

As shown schematically in FIG. 1A, the artificial horizon device 10 comprises three components: a sensor unit 12, a processing unit 14 and, preferably, a display unit 16. The sensor unit functions to provide an output signal corresponding to the sensor measurements of the unit. The display unit functions to provide a humanly perceptible indicator of the output signals of the sensor unit. A variety of secondary devices may be used in place of the display unit. The processing unit coordinates the output signals of the sensor unit and operates the sensor unit, the display unit and any secondary devices.

The sensor unit includes one or more sensors 18 mounted on a platform 20. The platform is operably connected to two or more actuators 22, 24, at least one of which is connected to a base 26. The processing unit 16 may be signally connected to the one or more sensors, the actuators, the display unit and any secondary devices. A communications link 28 between the processing unit 16 and the sensor unit 12 is an example of a suitable signal connection. The display unit includes at least one indicator 30.

In another embodiment, as seen in FIG. 1B, the horizon device 10 has the processing unit 14 and display unit 16 mounted on the platform 20 within the sensor unit 12. Here, a wireless communications link could be used to provide instructions from the processing unit to the actuators or secondary devices. A rechargeable battery could be used as a power supply for the processing unit, the display unit, the actuators, and sensors on the platform.

Sensor Unit

The one or more sensors mounted on the platform may be motion sensors, orientation sensors, and combinations thereof. The sensors may be global, local or combinations thereof, where a global sensor measures a characteristic (e.g. platform orientation) relative to an external mass (e.g. the Earth, moon, sun, planetary object, etc.), while a local sensor measures a characteristic relative to the vehicle (e.g. the motion or orientation of the platform relative to the vehicle).

Exemplary motion sensors include accelerometers, gyroscopes, speedometers, vehicle tracking sensors, or the like. For example, an accelerometer may be used to measure the acceleration of the platform relative to an external mass, whereas a gyroscope may be used to measure the rate of the pitch, roll, yaw or all three of the platform relative to the external mass.

Exemplary orientation sensors include those that determine the orientation of the platform relative to the vehicle. One or more joint angle sensors may be used to measure the orientation of the platform relative to the vehicle. Alternately, one or more encoders, potentiometers, resolvers, linear variable differential transducers (LVDT) may be used. Also, the actuators may operate as orientation sensors.

Preferably, the sensors are solid state devices based on MEMS technology as these are very small, are light weight and have the necessary accuracy while not being cost prohibitive. Each utilized sensor provides a suitable output signal containing the information measured by the sensor. The sensor output signal may be in any data format useable by the processing unit, but typically will be digital. Furthermore, wireline or wireless communication links may be utilized to transfer signals between the sensor unit and the processing unit. Preferably, a wireless RF link is utilized.

Preferably, a complement of a two-axis accelerometer or two accelerometers and two gyroscopes are used as the sensors in the sensor unit. If the vehicle exercises banking movements (e.g. slow turning rate at a constant roll-angle), then an additional gyroscope is desirable. In another aspect of the artificial horizon device, additional sensors may be used on the base. For example, a dual-axis accelerometer may be used on the base to be used in the calculation of the compensation factor and more particularly, a source of information to be utilized by a Kalman filter.

Platform

The platform may be any substrate to which one or more sensors may be mounted, including a platform made of one or more other sensors. Preferably, the platform is made of a relatively inert material whose size and shape do not significantly change in the ambient operating conditions of the horizon device. For example, the platform is preferably dimensionally stable between about −40° C. and about 200° C. and between about 0.01 psi and about 500 psi. The size and shape of the platform is not critical, but suitably will be sized and shaped to maximize maneuverability of the platform given the space constraints of the particular application. For example, a small, light weight square platform would be suitable for a portable device. All a small, light weight platform would be desirable to increase the maneuverability of the platform by smaller actuators.

Preferably the platform includes two axes of rotation that are perpendicular and lie in the plane of the platform. In one embodiment, the platform is a unitary piece where one axis cannot move independently of the other axis. As seen in FIG. 2A, rotating the platform 50 about axis 52 will cause the position of axis 54 to move (e.g. translate through space). In another embodiment, a bifurcated platform is utilized, where one axis can move independently of the other axis. As seen in FIG. 2B rotating a first portion 60 of the platform 62 about a first axis 64 will not cause the position of a second portion 66 (with a second axis 68 of the platform 62 to move. Here, rotation of one platform portion about an axis does not cause the other platform portion to also move.

The axes of rotation assist in defining the preferable placement of sensors on the platform and relative to one another. The accelerometers are preferably placed in the plane of the platform. If the accelerometers are not placed in the plane of the platform, they are preferably placed in a plane that is parallel to the plane of the platform, such that the distance between the planes is minimized. The gyroscopes are each preferably placed on an axis of rotation, although each may be placed so as to be aligned with a line that is parallel to the axis of rotation. For a sensor unit including a third gyroscope, it is preferably placed on an axis of rotation that is orthogonal to the other axes of rotation. Alternately, the third gyroscope may be places so as to be aligned with a line that is parallel to the axis of rotation.

Actuators

One or more actuators connect the platform to the base. The actuators may support some or all the weight of the platform, move the platform relative to the base, or both. The actuator may be any device that causes the platform to move in one or two dimensions. Preferably, at least two independent actuators are utilized for each platform, where one actuator each is responsible for rotation about an axis of rotation (e.g. one each of pitch and roll). Multiple, redundant, reserve actuators may also be used. The actuators are signally connected to the processing unit for receiving instructions from the processing unit, for sending data to the processing unit, or both. Preferably, the range of motion provided by of each the actuators is unbounded, such that an actuator may cause the platform to rotate thought 360° about an axis of rotation. Such an unbounded range of motion is particularly useful in combination with sensors that are not connected by wireline to other components of the horizon device. Bounded ranges of motion are also contemplated such as between about −90° and about 90° left and right (i.e. roll) or between about 90° and about −90° up and down (i.e. pitch). Of course a combination of bounded and unbounded ranges of motion may also be used. Furthermore, limit switches may be used to bound otherwise unbounded ranges of motion. For example, instructions from the processing unit may act as limit switches or a device such as a potentiometer may be used.

For example, the actuators may be a motor, a hydraulic actuator, a pneumatic actuator, an electro-mechanical actuator, and combinations thereof. Suitable motors include servomotors, stepper motors, or the like. Electro-mechanical actuators include devices that mechanically flex upon the application of electromagnetic energy. Electromechanical actuators may be made of a piezoelectric material, an electrostrictive material, a magnetostrictive material, a piezoresistive material, an elasto-optic material, an anisotropic material, and combinations thereof.

The actuators may be directly connected to the platform (e.g. through an axle) or may be indirectly connected to the platform, such as through a mechanical linkage (e.g. gears, belts, chains, etc.). Preferably, the connection between the actuators and the platform permits an unbounded range of motion, though connections that do not permit unbounded ranges of motion are also contemplated.

In a unitary platform embodiment, the actuators are preferably both mounted to the base, although other configurations are also possible (e.g. one mounted on the other or the like). A gear may be used to link the actuators to the platform. In a bifurcated platform embodiment, preferably one actuator is mounted to the base and the other is mounted to one of the portions of the platform, although other configurations are also possible (e.g. both mounted to the platform or the like). Belts or gears may be used to link the actuators to the portions of the platform.

Furthermore, the actuators may also include the function of sensing the orientation of the platform.

Selection of the actuator is application dependent in that a quick actuator (e.g. a high wattage motor); however, space considerations of the horizon device preferably lead to selection of a small actuator. Thus, a quick, small actuator would be preferred.

Base

The base is any substrate to which the one or more actuators, platforms, or platform portions may be mounted. The base generally is connected to the vehicle, either directly or indirectly, or is part of the vehicle. The connection between the base and the vehicle may be substantially rigid, but the base may also be isolated, such as through a rubber material, from vibrations or temperature differences generated or transmitted through the vehicle. As seen in the figures, the base may be part of the sensor unit, but this is not necessarily the case, as it may be separate from the sensor unit, processing unit, display unit, or any secondary devices.

Processing Unit

The horizon device further comprises a processing unit for receiving output signals from components in the sensor unit (e.g. sensors, or actuators), other components of the horizon device (e.g. the display unit), secondary devices of the vehicle (e.g. navigation system), or the like. The processing unit may also be utilized for providing output signals (e.g. instructions, reported information, or the like) to the components of the sensor unit, horizon device (e.g. the display unit) or secondary devices (e.g. navigation system).

In one particular aspect, the processing unit uses a closed loop feedback control scheme to take in the motion sensor output signals and to issue output signals to instruct the actuators on how to move the platform. The processing unit uses the motion sensor output signals to determine the current orientation (i.e. the pitch and roll) of the platform relative to the external mass (e.g. the earth). From knowing the current orientation of the platform, the processing unit instructs the actuators to move the platform so that it is horizontal relative to the external mass, i.e., the platform's pitch and roll are continually adjusted to both be zero relative to the external mass. In this way, the platform will always align with the horizon from the vehicle operator's viewpoint. For example, if the vehicle rolls to the right by 45°, then the platform with roll to the left by 45° and if the nose of the vehicle pitches down by 15°, then the platform with pitch up by 15°. By continually contradicting the motion of the vehicle, the platform continually tracks the horizon and serves as a proxy for the horizon.

In one embodiment of the control scheme, a Kalman filtering technique is utilized. Kalman filtering iteratively predicts the next platform orientation, while refining successive predictions with each iteration. Kalman filtering may use four basic calculations: 1) predicting the next platform orientation based on the current platform orientation (e.g. initial conditions); 2) comparing the predicted orientation with the actual orientation from the available sensor output information; 3) correcting the prediction with the differences between predicted orientation and actual orientation of the platform; and 4) calculating actuator outputs to control the platform to the next platform orientation. The output from the Kalman filter may then be passed to actuators to move the platform.

Processing Unit Location

The processing unit may be located throughout the vehicle, and preferably within the operational center of the vehicle (e.g. the cockpit). The processing unit may be physically local to the sensor unit or remote therefrom. In one embodiment, the sensor unit, processing unit and display unit are integrated into a single housing. Most preferably, the processing unit is mounted on the platform of the sensor unit. In another embodiment, the sensor, processing and display units are separate devices contained in a plurality of housings. Multiple, redundant, reserve processing units may also be used.

Update Rate

The processing unit may update its platform orientation determination, comparison, platform adjustment, or all three, at any rate appropriate for the speed of the vehicle. For example, the update rate may be less than about 1, more than about 1, more than about 5, more than about 10, more than about 15, more than about 20, more than about 25, more than about 50, more than about 75, more than about 100, more than about 250, more than about 500, more than about 750, or more than about 1000 times per second if needed by the application (e.g. for a fighter jet). Intervening numbers in these ranges are also specifically contemplated within this invention.

Compensation Factor

As part of the closed loop feedback control scheme, a compensation factor may be utilized to reduce the effects of changes in the observed gravity due to motion of the vehicle on the platform orientation. In one embodiment, the effects of changes in observed gravity are substantially eliminated through the use of the compensation factor. For example, during a banked turn, the direction of the observed gravity vector (i.e. from the centrifugal force) deviates from the normal gravity vector (i.e. straight down). Further, the magnitude of the observed gravity vector will deviate from the magnitude of the normal gravity vector. Without the compensation factor, the processing unit would adjust the platform orientation to be horizontal to the observed gravity vector. For certain applications and certain vehicles, this would not reflect the true horizon, but it would correspond to the observed horizontal of the vehicle, rendering the output signal to a display unit or a secondary device inaccurate. For example, vehicles that are moving relatively quickly (e.g. more than about 10 m/s) may benefit from the use of a compensation factor. For these types of applications, the compensation factor may be used as an alternative to or in addition to the output of motion or positions sensors in adjusting the platform orientation. The compensation factor may also be used in the Kalman filtering technique to adjust the prediction of platform orientation.

The direction of the normal gravity vector aspect of the compensation factor may be determined from a zero point (e.g. the platform orientation immediately before the initiation of the banked turn), from other initial conditions, from GPS information or other navigations information. The magnitude of normal gravity vector may be an output from one or more the utilized sensors (e.g. accelerometer, gyroscope, or the like) immediately before the initiation of the vehicle motion in question. Alternately, the normal gravity direction and magnitude aspects of the compensation factor may be determined by monitoring the attitude of the vehicle for a period of time before the initiation of the vehicle motion. The time period that needs to be monitored to provide the compensation factor may be less than about 0.25, more than about 0.5, more than about 0.75, more than about 1.0, more than about 2.0, more than about 3.0, more than about 4.0, more than about 5.0, more than about 10, more than about 15, more than about 20, more than about 25, more than about 50, or more than about 100 seconds. Intervening time periods in these ranges are also specifically contemplated within this invention. As the length of the time period increases, the accuracy of the compensation factor also increases. The compensation factor may be recalculated continuously, intermittently, on demand or in all three manners. The compensation factor may be applied continuously, intermittently, on-demand, or in all three manners. Also, the compensation factor may be applied to the control scheme at any time, whether or not the observed gravity vector deviates from the normal gravity vector.

The direction and magnitude of the normal gravity vector may also be calculated from the turning rate and the speed of the vehicle. The turning rate can be measured from a yaw-rate sensor (e.g. a gyroscope or from GPS information), and the speed of the vehicle would be available as an external sensor input to the processing unit. The turning rate and vehicle speed may be used to calculate the lateral acceleration of the vehicle, which in turn may be subtracted from the output signal from the accelerometer for the roll motion to give the normal gravity. Other suitable methods of determining the observed or true gravity vector may also be used. For example, a value retrieved from library of localized gravity vectors (e.g. as available through GPS) may be used as the normal gravity vector.

Furthermore, the compensation factor may also be used to limit or eliminate errors (e.g. drift) in the baseline output of the one or more sensors caused by existing conditions. For example, elevated or depressed temperatures, pressures or humidity may cause sensors' output to drift from their baseline and the compensation factor may be used to correct for this.

Processing Unit Output

In addition to communicating with the actuators, the processing unit is also used for communicating an output signal to the display unit or to one or more secondary devices. The output signal may be utilized by the display unit to provide a humanly perceptible indicator, discussed more fully below. The output signal of the processing unit may also be utilized by the one or more secondary devices as an input signal. In this instance, the output signal is not usually humanly understandable, but this is not necessarily the case. The information of the output signal may be combined with information of the secondary device, which in turn may be communicated to a display unit or another secondary device. This may be done any number of times to create an ever increasingly comprehensive data set that may be fed to a display unit or another secondary device.

The processing unit output signal may be transmitted by wireline or wirelessly to the sensor unit, to the display unit, or to secondary devices using any suitable data format. In one embodiment, the output signal may be transmitted to one or more control stations located remotely from the vehicle. For example, in the case of an aerial unmanned vehicle, the processing unit may send a signal to a ground control station operated by a human. In another embodiment, the output signal may be transmitted to other vehicles to support inter-vehicle functionality such as convoying, collision avoidance, or other functionality designed to improve coordinated action among multiple vehicles.

Processing Unit Input

The processing unit may also be used for receiving an input signal from secondary devices, such as those discussed above. The types of information that may be received include local or global geographic coordinate information (e.g. GPS data), vehicle speed (e.g. air speed of an aircraft), yaw rate data, vehicle status data, temperature, altitude, humidity, air pressure, or any other type of external or environmental information that may be used to compensate for error in the sensors or adjust the overall system performance, or the like. Vehicle status data may include information about the operability of other sensors or systems on the vehicle, e.g. whether a redundant horizon device is operable, whether a redundant display unit is operable, whether vehicle control devices (e.g. engines, transmissions, yokes, steering wheels or flight control surfaces (e.g. rudders, ailerons, or the like)) are operable, or the like. Vehicle status data may also include information regarding objects in the vicinity of the vehicle such as other vehicles, obstacles (e.g. building, animals, etc.), or the like. The sensor input signal may be transmitted by wireline or wirelessly using any suitable data format.

Additional Functionality for the Processing Unit

In addition, the processing unit may further comprise micro-controllers, external memory, power amplifiers, signal conditioning units, transmitters, receivers, input/output ports, power supply circuitry, or the like. The processing unit may also include software encompassing the control algorithms for the function of the processing unit, sensor unit, display unit, secondary device, combinations thereof, or the like.

Display Unit

The display unit of the artificial horizon device provides one or more humanely perceptible indicators to the operator. The purpose of the indicator is to counteract the operator's sensory confusion during vehicle operation by showing the operator the horizon. Humanly perceptible means that any of the human senses may detect the indicator. Visual, auditory and tactile indicators are preferred, but odor and taste indicators are also contemplated. Combinations of sense indicators are also contemplated, as are multiple, redundant, or reserve indicators for a single sense. A visual indicator may be visible in the operator's main field of vision, the operator's peripheral field of vision, or both. Otherwise the indicator is located so that the operator can sense the indicator; e.g. within earshot of an audible indicator (e.g. an ear piece) or touching the operator for a tactile indicator (e.g. in the seat). In one preferred embodiment, the indicator is located on a heads-up display for the operator; for example, on the windshield of the vehicle, on the interior surface of a visor or eyeglasses, on a personal video display device attached to a helmet or eyeglasses of the operator, or the like.

Visual Indicator-Laser Line

In one embodiment of a display unit with a visual indicator, a light device (e.g. a laser) projects at least one light line representing the horizon in a heads-ups manner for the operator. As seen in FIG. 3, in an aircraft cockpit 80, a light line 82 is preferably displayed by a display unit 84 on the windshield 86 as well as on the side windows 88, such that the light line has a length that crosses both the operator's main and peripheral fields of vision. In one embodiment, the display unit is mounted behind the operator and so that the horizon is displayed at roughly eye level for the operator.

The light device may be located on the same platform used in the sensor unit. In this way, as the platform orientation is adjusted, the light line for the operator is also adjusted. In another embodiment, the light device is mounted on a platform separate from the sensor unit platform. Here, the sensor unit platform would as the master, and the display unit platform would act as a slave, tracking the movement of the master.

Visual Indicator-Light Bar

Figure 4:
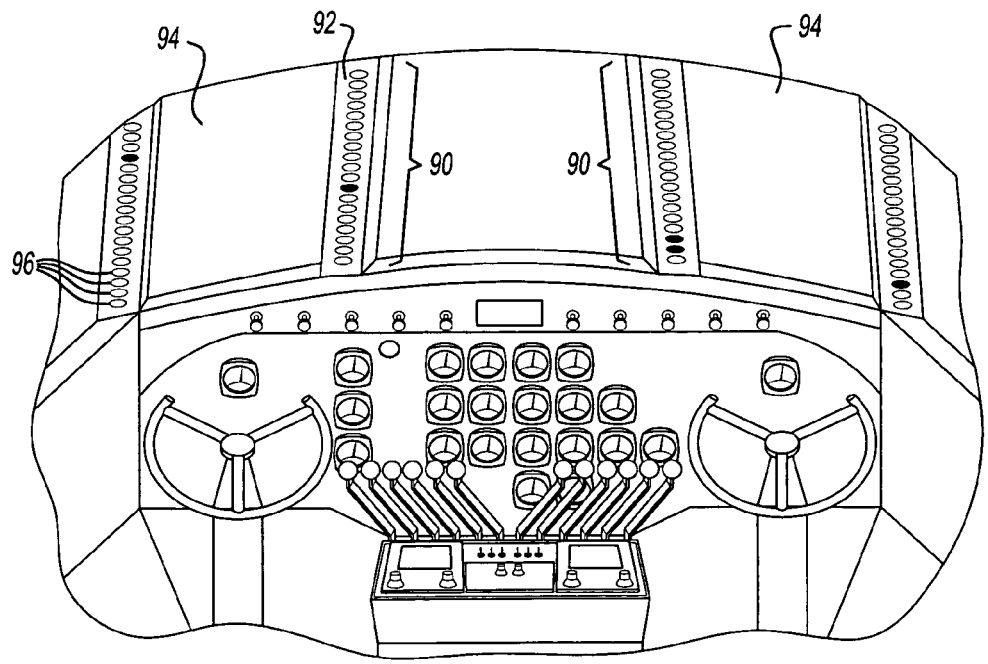
FIG. 4 shows a horizon device with a light bar visual indicator.

In another embodiment of a visual display unit, a plurality of light bars is located on or near the windshield of the vehicle. The light bars 90 are generally vertically aligned and preferably located on the frame 92 of the windshield 94, as seen in FIG. 4. Each light bar comprises a plurality of lights 96 (e.g. incandescent bulbs, LEDs, or the like) that are individually controllable. The lights preferably have an oblong shape, with the long side corresponding to the horizontal. The horizon is indicated by illuminating individual lights on the light bars, as indicated by the solid lights in FIG. 4. As the horizon shifts, due to vehicle movement, the illumination of lights shifts to match the location of the horizon. In this embodiment, the lights are predominantly in the operator's peripheral field of vision.

Color as Status Indicator

In one embodiment, the visual indicator utilizes color to provide additional information. For example, a green light may be use to indicate that the vehicle is operating normally within prescribed parameters, e.g. the aircraft is flying levelly. A yellow light may be used to indicate that the vehicle is operating normally, but close to exceeding the prescribed parameters, while a red may be used to indicate that the vehicle is operating outside prescribed parameters. For example, in the light line embodiment, a single light device may be used to generate each color of light. Alternately, a filter or other mechanism may be used to change the color of the light line. In the light bar embodiment, the lights near the middle of the light bars may be of one color while the lights near the ends of the light bars may be of another color. The particular color of the lights is not critical, nor is the number as four, five or more colors may be utilized.

A display unit with a visual indicator may incorporate various devices to facilitate optical communication of the light to the operator (e.g. fiber optical cables, filters, mirrors, lens, prisms, or the like).

In addition to the horizon line, the display unit may also display information conveying information about the status of the vehicle, e.g. the pitch or roll of the vehicle may be indicated with a separate light line or with a separate set of lights on the light bars. Alternately, the pitch and roll may be displayed numerically on a heads-up display or near the light bars. The display unit or the indicator may also include a directional indicator such that, in addition to the horizon, the 'up' direction is displayed. A directional indicator is particularly useful because the operator's sense of gravity may become so impaired that 'up' cannot be accurately determined. The directional indicator may take, for example, the form of an arrow pointing in the desired direction. For the light bar embodiment, the directional indicator may take the form of different colored lights representing the 'up' direction. Other indicators (e.g. auditory, tactile, etc.) may be used as the directional indicator in combination with the visual indicator.

Tactile Indicator

In one embodiment of a display unit with a tactile indicator, the operator's seat, backrest, head rest, arm rest or combinations thereof may vibrate or apply pressure in response to the information provided by the sensor unit. Also, the operational controls (e.g. yoke, steering wheel, or the like) may vibrate or apply pressure. The vibration or pressure may be present or absent to indicate that the vehicle is operating normally within prescribed parameters. A mild vibration or pressure may be used to indicate that the vehicle is operating normally, but close to exceeding the prescribed parameters, while a strong vibration or pressure may be used to indicate that the vehicle is operating outside prescribed parameters. Further, position of the vibration or pressure may also be used to indicate where the horizon is; for example, a vibration or pressure under the right thigh or right hand of the operator may indicate that the operator needs to turn to the right to correct or adjust the position of the vehicle or vice versa. In addition, to vibration and pressure, temperature differences may also be used as a tactile indicator.

Auditory Indicator

In one embodiment of a display unit with an auditory indicator, one or more speakers, (e.g. ear pieces) may emit sound in response to the information provided by the sensor unit. The sound may be present or absent to indicate that the vehicle is operating normally. A mildly loud sound may be used to indicate that the vehicle is operating normally, but close to exceeding the prescribed parameters, while a louder sound may be used to indicate that the vehicle is operating outside prescribed parameters. The sound may include bells, beeps, rings, tones, voices, combinations thereof, or the like. Additional information may be conveyed by combining sounds together; a rapid series of tones may convey urgency, while voices may be used to instruct the operator in appropriate actions (e.g. "Turn left."). Furthermore, stereo sound may be used to convey information. A tone only in the right ear may indicate that the operator needs to turn to the right to correct or adjust the position of the vehicle or vice versa.

Display Unit Location

The display unit may be located throughout the vehicle, and preferably within the operational center of the vehicle (e.g. the cockpit). The display unit may be physically local to the processing unit or sensor unit or remote therefrom. In one embodiment, the sensor unit and display unit are integrated into a single housing. Most preferably, the display unit is mounted on the platform of the sensor unit. In another embodiment, the sensor, processing and display units are separate devices contained in a plurality of housings. Multiple, redundant, reserve display units may also be used. The indicator is usually projected or otherwise provided to the operator at a location remote from the display unit, although this is not necessarily the case. For example, the display unit may be located behind the pilot in an aircraft while the light line indicator is projected on the windshield.

Secondary Devices

A secondary device may be any device or system located on or off the vehicle that may utilize information from the processing unit. As discussed above, output from the processing unit to any secondary device is usually not humanly understandable, but this is not necessarily the case. Exemplary secondary devices include navigation systems (e.g. attitude reference system (ARS) or attitude-heading reference systems (AHRS)), devices on the control panel or dashboard, third party display systems (e.g. primary flight display (PFD)), autopilot systems (e.g. flight controls), tracking systems, redundant horizon devices, warning systems (e.g. anti-roll-over alarms, electronic stability devices, or the like), data logging devices, telemetry devices or the like for the vehicle. For example, the horizon device may provide attitude information to replace or backup another ARS on the vehicle. Also, the horizon device may provide attitude information that may be combined with other heading information to provide an AHRS. In another embodiment, the secondary device may be an autonomous vehicle.

Power Supply

The horizon device further comprises at least one power supply for the operation of the sensor unit, processing unit, display unit, or combinations thereof. The power supply may be a battery or a power generator, or the like. Any battery type may be used; for example, a wet cell battery, a dry cell battery, a rechargeable battery, a disposable battery, or the like. The battery may be local to the horizon device or local to the vehicle. More particularly, the battery may be located on the platform, the base, or both. In one preferred embodiment, no wires are used to connect a battery on the platform to the rest of sensor unit, to the processing unit or to the display unit. For example, a current passed through a first inductive loop coil will cause electricity to flow in a second inductive loop coil located nearby. Although only small amounts of electricity will be induced, it will be sufficient to wirelessly recharge a battery. Other techniques for wireless recharging of batteries may also be suitable. Recharging of the battery may be continuous, intermittent or on an as needed basis. In one embodiment, each of the sensor unit, processing unit and display unit include their own battery, and may further include multiple, redundant, or reserve batteries.

Any power generator may be used; for example, power generators that convert mechanical, solar or thermal energy to electricity are suitable. Thus, alternators, solar cells or thermoelectric devices may be suitable power generators.

The power source is electrically connected to the other components of the horizon device, be it be through a wireless or wireline connection. In one preferred embodiment, multiple, redundant, or reserve power supplies are utilized for the horizon device, or its components.

User Controls for the Horizon Device

In addition, the artificial horizon device may also include one or more user interface devices. User interface devices permit the operator to turn on or off the device or otherwise alter the function or position of the horizon device or its components. The user interface devices may be located on the sensor unit, the processing unit, the display unit or elsewhere and alter functions remote from the user interface device. For example, a knob on the sensor unit may adjust the position of the horizon line projected from the display unit. Also, a user interface device may be used to customize the location of the horizon line or strength of the indicator to the operator's preferences. For example, with a visual indicator, the display unit may include a mechanism to adjust the location to customize the horizon for each operator's eye level. The volume of an auditory indicator may be adjustable to suit the operator via a user interface device. Suitable user interface devices include buttons, knobs, switches, sliders, touch displays, voice activated commands, the like, and combinations thereof.

Exemplary Horizon Device

Figure 5:
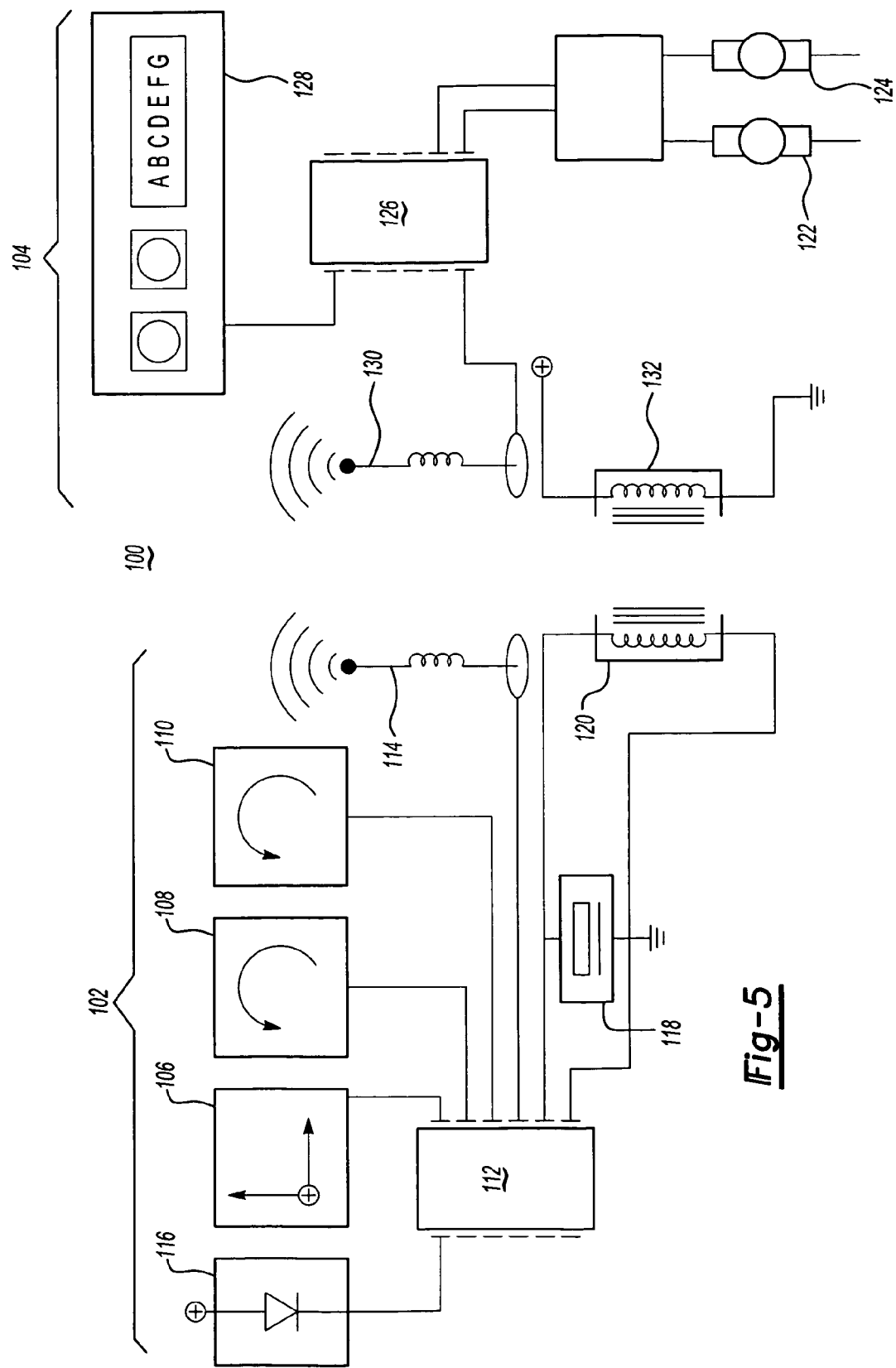
FIG. 5 schematically shows an exemplary horizon device.

As seen in FIG. 5, a horizon device may schematically be represented as follows. In this embodiment, the horizon device 100 includes two portions: a platform portion 102 and a base portion 104, with the functionality of the sensor, processing and display units divided among the two portions. The platform portion includes a two-axis accelerometer 106 and a pair of gyroscopes 108, 110, one for each rotational axis. An electronic control unit (ECU) 112 may take in signals from the accelerometer and the gyroscopes, as well as signals received at the antenna 114 from components on the base or from secondary devices. The ECU also operates a laser diode 116 located on the platform. A rechargeable battery 118 acts as a power supply for the components on the platform. A coil 120 allows the battery to be recharged wirelessly.

The base includes a pair of actuators 122, 124 connected to the platform. An ECU 126 may take in signals from a user interface 128, secondary devices and the antenna 130. The ECU also issues signals to the actuators to move the platform. A coil 132 provides electricity to recharge the battery on the platform.

In this embodiment, the antennae 114, 130 and coils 120, 132 permit the platform to have an unbounded range of motion because the platform is not burdened with wireline connections to the base.

Figure 6:
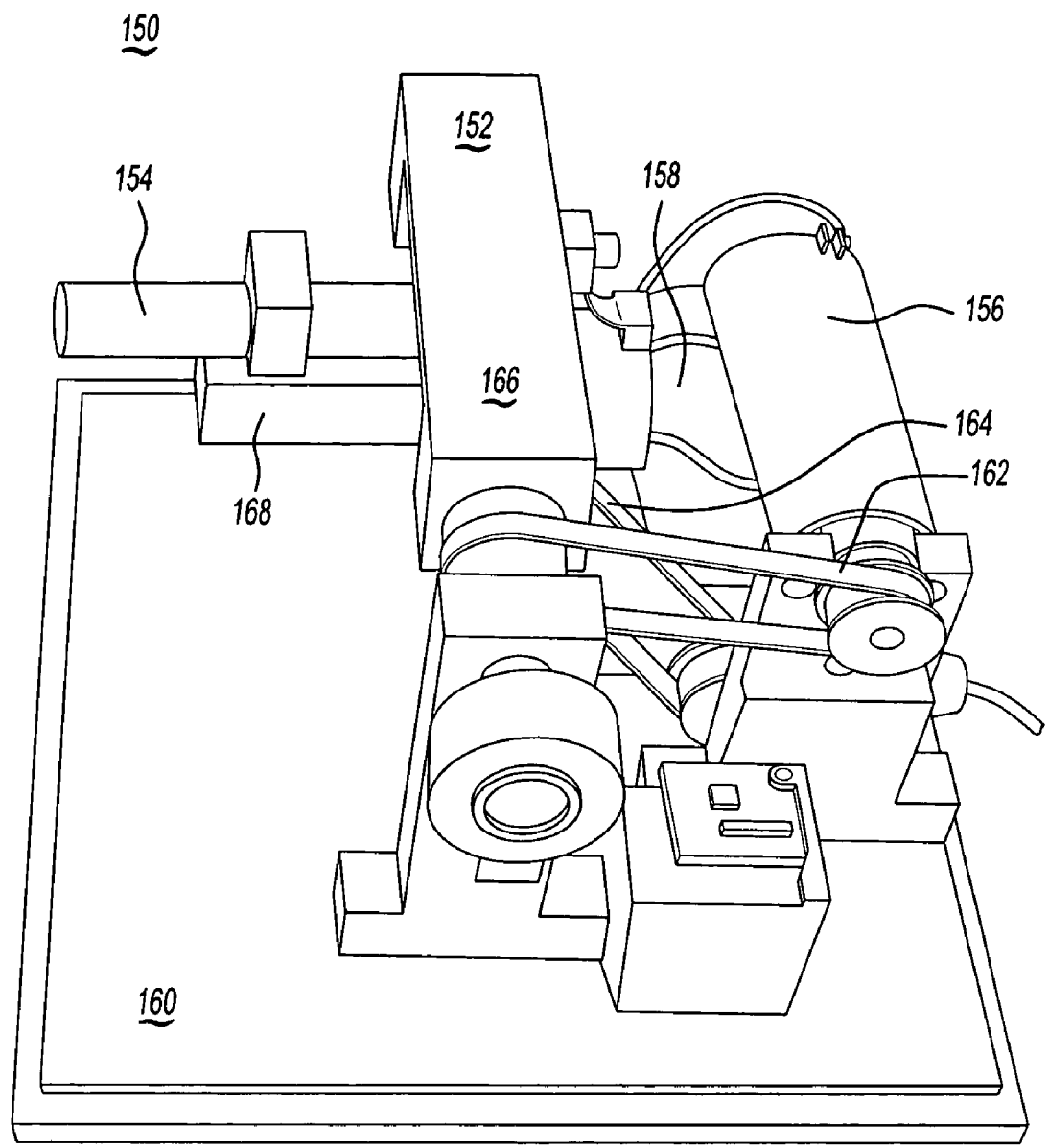
FIG. 6 shows an exemplary horizon device.

As seen in FIG. 6, a horizon device is depicted. In this embodiment, the horizon device 150 includes a bifurcated platform 152 upon which a laser line device 154 is mounted. Actuators 156, 158 move the platform in response to commands from the processing unit (not shown) located under a base 160. The actuators are mounted on the base and mechanically linked to the platform by at least belts 162, 164. A split platform is used in this embodiment, with actuator 156 causing one portion 166 of the platform to pitch and actuator 158 causing another portion 168 of the platform to roll. An accelerometer (not shown) and gyroscopes (not shown) are mounted on the platform.

Methods for Artificial Horizon

The present invention also includes methods of determining the artificial horizon. The method includes measuring the platform orientation relative to an external mass and adjusting the platform orientation so that the platform is horizontal to the external mass.

In one embodiment, the measuring step includes measuring an angle, theta, between an orientation axis (e.g. observed gravity) of the platform and a normal gravity vector. For example, a platform in vehicle has an orientation axis that is normal to a plane of the platform or parallel to the plane of the platform. By knowing both the direction of orientation axis and gravity vector, the angle theta is also known.

In this method, the adjusting step includes moving the platform to minimize the angle theta, such that the orientation axis and the gravity vector are co-linear or parallel. Actuation of the actuators may be used to adjust the platform orientation. By adjusting the orientation axis to the gravity vector, the platform aligns to be horizontal to the external mass and acts as a proxy or artificial horizon for the actual horizon.

In another embodiment, the method of determining the artificial horizon includes comparing an orientation, relative to an external mass, of a platform in a vehicle at a first time to an orientation of the platform at a second time. This may be done by calculating the rate of change of the orientation of the platform or the derivative of position (i.e. velocity) and also be calculating the rate of change of the velocity of the platform or the derivative of velocity (i.e. acceleration). If the orientations deviate from each other, then the method also includes adjusting the orientation of the platform to partially or wholly eliminate the deviation. The adjustment may be carried our by the actuators.

In another embodiment, the method of determining the artificial horizon includes monitoring the motion of the vehicle or the platform relative to the external mass. Sensors on the platform, on the base or in secondary devices may be used to provide information on the movement of the vehicle or platform. In the adjusting step, actuating the actuators is used to counteract the motion of the vehicle or platform. As vehicle rolls right, the platform rolls left by an equal amount; as the vehicle pitches down, the platform pitches up by an equal amount.

The methods may further include displaying the artificial horizon by displaying the desired indicator, applying a correction factor to the gravity vector, predicting platform orientations, communicating with secondary devices, the like, and combinations thereof.

Vehicle

The artificial horizon device may used in any vehicle, preferably with a power supply, and more preferably motorized vehicles. Un-motorized vehicles (e.g. gliders) may also be suitable vehicles if the horizon device or vehicle includes it own power supply. The horizon device is particularly useful in vehicles that have general freedom in their movements such as sub-marine vehicles, subterranean vehicles, fixed and rotary wing aircraft, or the like. The horizon device may also be used in vehicles with more limited freedom in their movements such as marine vehicles, and surface vehicles such as automobiles and trains. While primarily useful in humanly operated vehicles, the horizon device nevertheless may find applications in vehicles such as aerials drones or mobile robots.

Operator

Operator means any person who has the ability or authority to operate the vehicle and preferably is located in or on the vehicle (e.g. driver, pilot, co-pilot, navigator, passenger, or the like). In one embodiment, the operator of a remotely controlled vehicle is located separately from the vehicle and communicates with the vehicle wirelessly.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A self-leveling laser horizon device for navigational guidance comprising:
    a housing that is adapted to removably engage a substrate of a vehicle and having a power supply defined therein;
    a sensor unit having a platform, at least one actuator to move said platform and at least one sensor to sense the orientation of said platform relative to the Earth's gravitational vector, and at least one local sensor that is operatively disposed on said housing to sense the orientation of said platform relative to a portion of said housing;
    a processing unit that is operatively connected to said sensor unit, said processing unit having a receiver to receive a signals from said sensor and said local sensor, a processor to process signals from said sensor unit at a predetermined refresh rate utilizing a compensation factor to substantially eliminate an observed gravity vector perceived by said sensor unit during movement of the vehicle, a transmitter to deliver signals to said actuator to level said platform in a manner that is substantially perpendicular to the Earth's gravitational vector and an output link to deliver an output signal to a secondary device that displays data contained within said output signal in a manner that is humanly understandable; and
    a display unit operatively engaged to said processing unit and adapted to provide a humanly perceptible indicator of an artificial horizon across a portion of an instrument panel of the vehicle and having a control member to control said humanly perceptible indicator;
    wherein said humanly perceptible indicator is a light line that corresponds to the substantially perpendicular orientation of said platform relative to Earth's gravitation vector on said housing and wherein said sensor unit, processing unit and display unit are operatively disposed within said housing so as to provide a portable artificial horizon device for use within a vehicle.

2. A self-leveling laser horizon device for navigational guidance comprising:
    a sensor unit having a platform, at least one actuator to move said platform and at least one primary sensor to sense the movement of said platform along a first and second axis of rotation relative to the Earth's gravitational vector, and at least one secondary sensor to sense the yaw rate of said platform relative to the Earth's gravitational vector;
    a processing unit having a receiver to receive a signals from said sensor unit, a processor to process signals from said sensor unit at a predetermined refresh rate and a transmitter to deliver signals to said actuator to level said platform in a manner that is substantially perpendicular to the Earth's gravitational vector;
    a display unit that is operatively engaged to said processing unit and adapted to provide at least one humanly perceptible indicator of an artificial horizon within the vehicle which corresponds to the substantially perpendicular orientation of said platform relative to the Earth's gravitational vector; and
    a housing that is removably engaged to the substrate of the vehicle and having a power supply defined therein to provide a source of power to at least one of said sensor unit, said processing unit and said display unit, wherein said sensor unit, processing unit and display unit are operatively disposed within said housing to provide a portable artificial horizon device.

3. The self-leveling laser horizon device as set forth in claim 2 wherein said sensor unit further includes at least one dual-axis accelerometer operatively disposed within said housing and at least a pair of gyroscopes operatively disposed on said platform wherein said gyroscopes correspond to an axis of rotation of said platform.

4. The self-leveling laser horizon device as set forth in claim 2 wherein said processor further includes a compensation factor to substantially eliminate an observed gravity vector perceived by said sensor unit during movement of the vehicle.

5. The self-leveling laser horizon device as set forth in claim 2 wherein said processing unit further includes an output link to deliver an output signal to a secondary device that displays data contained within said output signal in a manner that is humanly understandable.

6. The self-leveling laser horizon device as set forth in claim 2 wherein said display unit further includes at least one control member to control the artificial horizon displayed within a vehicle.

7. The self-leveling laser horizon device as set forth in claim 2 wherein said humanly perceptible indicator includes a light line that is projected from said display unit and displayed across at least a portion of a vehicle's instrument panel.

8. The self-leveling laser horizon device as set forth in claim 2 wherein said sensor unit further includes at least one local sensor that is operatively disposed on said housing to sense the orientation of said platform relative to the substrate of the vehicle to which said housing is removably engaged.

9. A self-leveling laser horizon device for navigational guidance comprising:
- a sensor unit having a platform, at least one actuator to move said platform and at least one sensor to sense the orientation of said platform relative to the Earth's gravitational vector;
- a processing unit operatively connected to said sensor unit and adapted to receive a signal from said sensor and direct said actuator to level said platform in a manner that is substantially perpendicular to the Earth's gravitational vector;
- a display unit that is operatively engaged to said processing unit and adapted to provide at least one humanly perceptible indicator of an artificial horizon within a vehicle which corresponds to the substantially perpendicular orientation of said platform relative to the Earth's gravitational vector; and
- a housing that is removably engaged to a substrate of the vehicle and having a power supply defined therein to provide a source of power to at least one of said sensor unit, said processing unit and said display unit, wherein said sensor unit, processing unit and display unit are operatively disposed within said housing.

10. The self-leveling laser horizon device as set forth in claim 9 wherein said processing unit includes a receiver that is adapted to receive signals from said sensor, a processor to process the signals from said sensor at a predetermined refresh rate and a transmitter to deliver signals to said actuator to level said platform in manner that is substantially perpendicular relative to the Earth's gravitational vector.

11. The self-leveling laser horizon device as set forth in claim 10 wherein said processor further includes a compensation factor to substantially eliminate an observed gravity vector that is perceived by said sensor unit during movement of a vehicle.

12. The self-leveling laser horizon device as set forth in claim 9 wherein said processing unit further includes an output link to deliver an output signal to a secondary device that displays data contained within said output signal in a manner that is humanly understandable.

13. The self-leveling laser horizon device as set forth in claim 9 wherein said sensor includes at least one accelerometer to signal said processor unit when the orientation of said platform is non-perpendicular relative to the Earth's gravitational vector.

14. The self-leveling laser horizon device as set forth in claim 9 wherein said sensor includes as at least one gyroscope to signal said processor unit when the orientation of said platform is non-perpendicular relative to the Earth's gravitational vector.

15. The self-leveling laser horizon device as set forth in claim 9 wherein said sensor includes at least one speedometer to signal said processor unit when the orientation of said platform is non-perpendicular relative to the Earth's gravitational vector.

16. The self-leveling laser horizon device as set forth in claim 9 wherein said sensor is defined as at least one linear variable differential transducer to measure the orientation of said platform relative to a portion of said housing.

17. The self-leveling laser horizon device as set forth in claim 9 wherein said sensor unit further includes at least one local sensor that is operatively disposed on said housing and adapted to sense the orientation of said platform relative to the substrate of a vehicle to which said housing is removably engaged.

18. The self-leveling laser horizon device as set forth in claim 9 wherein said sensor unit includes two actuators to move said platform along at least two axes to level said platform in a manner that is substantially perpendicular relative to the Earth's gravitational vector.

19. The self-leveling laser horizon device as set forth in claim 9 wherein said display unit further includes at least one control member to control the artificial horizon displayed within a vehicle.

20. The self-leveling laser horizon device as set forth in claim 9 wherein said humanly perceptible indicator includes a light line that is projected from said display unit and displayed across at least a portion of a vehicle's instrument panel.

* * * * *